May 28, 1957        H. C. HEUSER        2,793,992
ELECTRICAL CUTTING AND GRINDING
Filed April 6, 1953
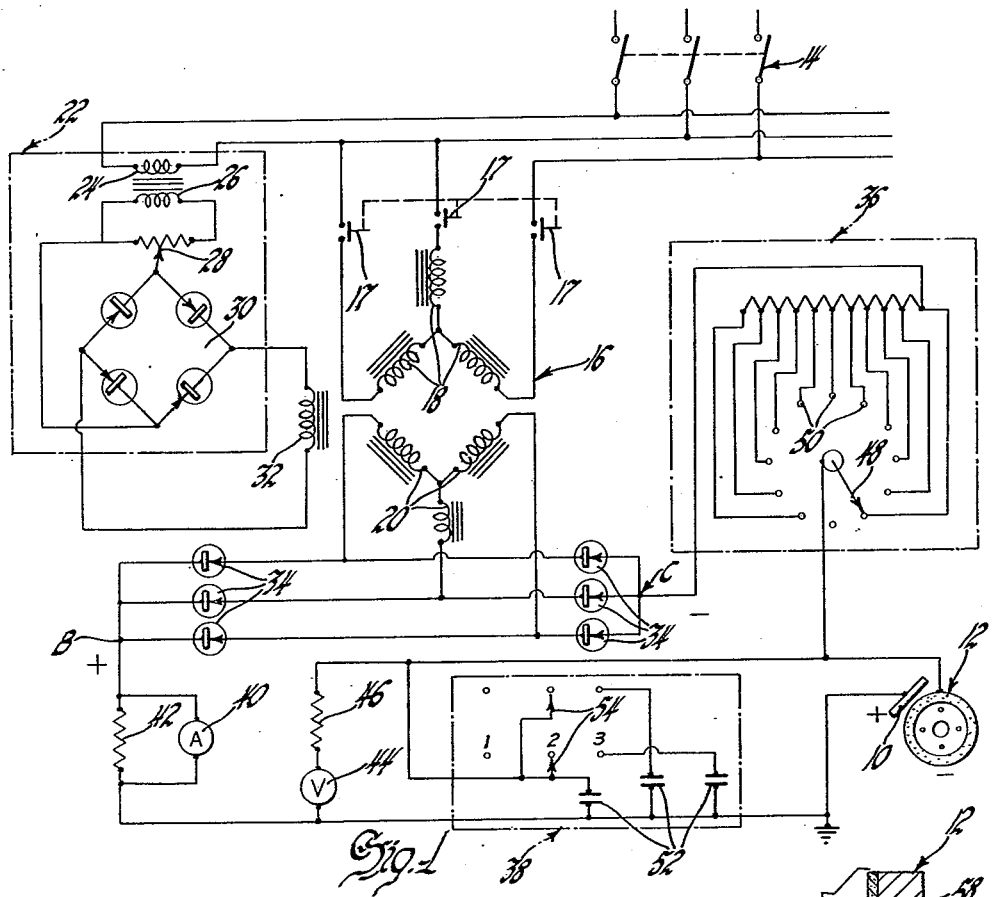
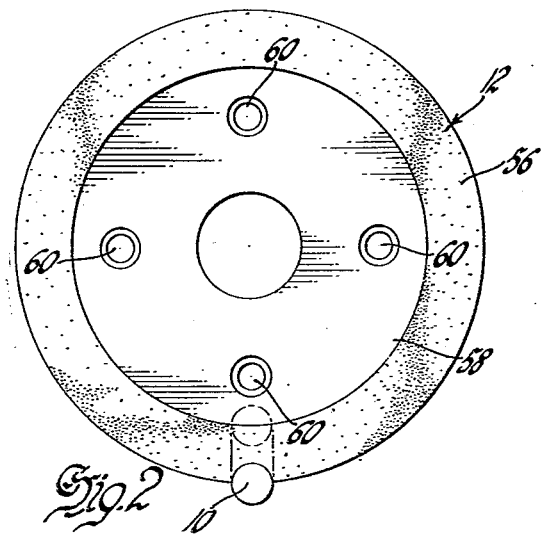
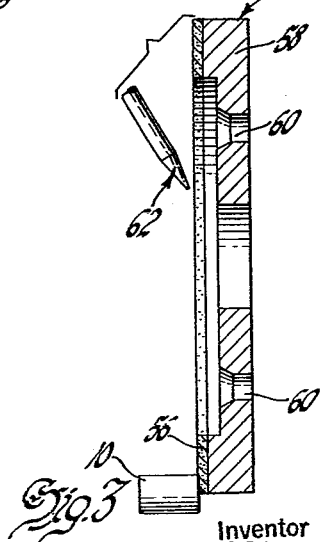
Inventor
Helmut C. Heuser
Stanley E. Ross
Attorney United States Patent Office 2,793,992
Patented May 28, 1957

2,793,992

ELECTRICAL CUTTING AND GRINDING

Helmut C. Heuser, Flint, Mich., assignor to General Motors Corporation, Detroit, Mich., a corporation of Delaware Application April 6, 1953, Serial No. 346,865

2 Claims. (Cl. 204—143)

This invention relates to improvements in the removal of electroconductive material by electrical cutting and/or grinding, and more particularly to an improved method and apparatus for cutting or grinding hard electroconductive materials.

Some prior use has been made of electrical cutting or grinding methods generally known as electro-erosion or electrolytic cutting. A typical method used heretofore has employed some form of apparatus providing a source of electrical energy and having a metallic cutting wheel connected to one electrical terminal, with a workpiece connected to the opposite electrical terminal. As the rotating cutting wheel and workpiece are brought together, there is an electrical discharge and electroconductive material is removed from the workpiece.

Certain difficulties involved in prior electrical cutting methods heretofore have precluded their use in large scale cutting or grinding of extremely hard tool materials such as sintered tungsten carbide and the like. As a result, up to the present time cutting and/or grinding of such materials has commonly required the use of diamond cutoff or grinding wheels. While diamond wheels are hard enough to be used in cutting or grinding tungsten carbide or other tool materials, the use of diamond wheels is undesirable from a practical standpoint since these wheels are costly and require careful handling during use.

In using prior electrical cutting methods, and in using diamond wheels, the primary problem dealt with has been that of cutting through the extremely hard electroconductive material. The finish resulting on the material being cut or ground has been of secondary importance, it generally having been assumed that the resulting surface on the part being cut or ground must later be subjected to a finishing operation in order to provide a smooth surface and to true up the edges which, in many cases, are chipped or otherwise damaged in the cutting or grinding process.

Accordingly, the principal object of this invention is to provide a method and apparatus whereby a smooth surface is provided on a hard, electroconductive material during cutting or grinding operations. A further object is the provision of apparatus for cutting or grinding extremely hard materials at a relatively low cost. A still further object is to provide a method of cutting and/or grinding of extremely hard electroconductive materials which render unnecessary the use of diamond type cutting or grinding wheels. A still further object is the provision of apparatus capable of forming an extremely smooth finish on electroconductive material. These and other objects will more fully appear from the description which follows.

In general, the present invention contemplates using an electro-erosion type of electrical cutting apparatus including a source of electrical energy, a material-removing electrode member, such as a cutting or grinding wheel, connected thereto, and means to press a workpiece against the electrode member while the workpiece is also connected to the source of electrical energy. In the practice of the present invention using such apparatus, the electrode member is formed from a mixture of finely divided refractory type material and an electroconductive binder, the shape and size of the electrode of course, depending on the particular application intended. Illustrative of the type of materials contemplated by the expression "refractory type materials" are such materials as aluminum oxide, silicon carbide, fireclay, kaolin, magnesite, or mixtures containing one or more of these materials. A preferred cutting or grinding wheel electrode is formed from a mixture of finely divided aluminum oxide, typically 60/80 grit, with a metallic binder.

In many instances, an optimum surface finish is obtained when a fluid is employed between the workpiece and the revolving wheel. I prefer to employ an electroconductive fluid, an aqueous solution of sodium silicate providing excellent results. A particular example of such a preferred fluid is a solution prepared by adding one part of sodium silicate to 2.5 parts of water by volume. In many applications optimum results are obtained by adding from about 5 to 20 ounces per gallon, preferably 10 ounces, of chemically pure sodium carbonate to the resulting sodium silicate solution.

In practice, the cutting or grinding wheel electrode is connected to one terminal of an electrical energy supply and the workpiece to the opposite terminal. By proper combination of resistances and capacitances in the circuit, a pulsating D. C. discharge is obtained when the workpiece is pressed against the cutting or grinding wheel. Superior results are obtained, as mentioned above, by passing a fluid between the workpiece and rotating wheel. The electrical and/or chemical phenomena occurring when the fluid is present between the cutter electrode and workpiece are not clearly understood but the superior results obtained are thought to be attributable to electrochemical action and/or to the rinsing or film-removing action of the finely divided refractory wheel particles which gradually are dislodged from the wheel electrode and become suspended in the fluid. Such action is thought to constantly provide on the workpiece a cleaned surface which is more susceptible to smooth rapid cutting or grinding by an electrical method. Using such a fluid, mirror-like finishes can be consistently obtained having profilometer values of about 3 or 4 microinches R. M. S.

In the accompanying drawing:

Fig. 1 is a schematic wiring diagram illustrating a suitable electrical supply circuit in accordance with the invention;

Fig. 2 is a plan view of a grinding wheel embodying the invention; and

Fig. 3 is a side view, partially in section, of the wheel shown in Fig. 2.

Referring more particularly to the drawing, Fig. 1 is a schematic wiring diagram of an electrical circuit as presently employed in the practice of the invention. The circuit is adapted to provide a pulsating direct current discharge between a workpiece 10 and a cutting or grinding wheel indicated generally at 12. A typical source of electrical energy, as indicated generally at 14, may be a conventional 440 volt, 3 phase, 60 cycle supply. The electrical energy is fed through transformer cutoffs 17 into a 3-phase transformer, designated generally at 16, including primary coils 18 and secondary coils 20 adapted to reduce the input voltage as desired. In the particular embodiment shown in Fig. 1, a portion of the electrical input also energizes a single phase auxiliary or booster transformer indicated generally at 22. This transformer includes a primary coil 24, a secondary coil 26, a potentiometer resistance 28, and a full wave rectifier 30. One connection across the rectifier 30 is adapted to contact the potentiometer resistance 28, and the conjugate arms of the rectifier are connected to a control winding 32. The 3-phase output of transformer 16, at a reduced voltage, typically 80–100 volts, is passed through single phase rectifiers 34 to provide a pulsating direct current, positive at point B, and negative at point C.

Once having established a pulsating direct current at points B and C, the magnitude of the current is subsequently controlled by an adjustable resistor 36 and the characteristics of the pulsating electrical discharge between the workpiece 10 and the cutting or grinding wheel 12 are regulated by a plurality of condensers indicated generally at 38. It will be understood that the selection of the various circuit components in any particular case will depend on the characteristics of the electrical energy supply and the application intended.

Typical current flow through the circuit during operation, as indicated by an ammeter 40 having a circuit resistor 42, is approximately 60 amperes. Excellent results are obtained in most instances by adjusting the circuit to provide a current of from 50–70 amperes, 55–65 amperes preferred at present. The voltage, as measured by voltmeter 44 having a circuit resistor 46 preferably is maintained in the range of about 10 to 30 volts, 16–22 volts preferred. Employing voltages and amperages within the above mentioned ranges, current densities, for most standard sized tool stock, are from about 300 to 350 amperes per square inch.

Figs. 2 and 3 illustrate one form of a wheel embodying the invention as particularly adapted for surface grinding. The wheel comprises a mixture of a finely divided refractory material and an electroconductive binder in the form of a ring 56 which is secured to a backing wheel 58 of steel or the like. The backing member 58 is provided with a plurality of holes 60 to permit mounting the wheel 58 to a spindle. It will be understood of course that the shape of the wheel is dictated by the application intended. For example, for cutoff work the cutting wheel may consist of a thin metal disk coated with one or more thin layers of a mixture of a finely divided refractory material and an electroconductive binder.

As shown in Fig. 3, for optimum results, a nozzle 62 is employed to project a stream of fluid against the face of the revolving wheel so that centrifugal force provides a thin film of fluid between the workpiece and the wheel.

The surface quality obtained depends on a variety of factors, the exact interdependence of which is not clearly understood at present. However, I have discovered that the most important factors, other than proper adjustment of the electrical circuit, include the provision of a fluid between the workpiece and rotating wheel, the reciprocation of the workpiece over the face of the wheel, the pressure with which the workpiece is pressed against the wheel, and the speed of the wheel surface past the workpiece.

To obtain optimum results, I have found that the pressure of the workpiece against the rotating wheel should be at least about 30 p. s. i., or generally a pressure equivalent to that obtained by firmly pressing a workpiece against the wheel by hand. If the pressure exceeds about 55 p. s. i., heavy wheel wear will occur in many applications. The speed of the revolving wheel for optimum performance depends, in part, on how the workpiece is pressed against it. Superior finishes are obtained when the workpiece is moved back and forth in a reciprocating movement across the face of the revolving wheel as indicated schematically in Fig. 2. More important than the number of revolutions per minute of the wheel, since wheels of different diameter are used, is the surface speed of the wheel past the workpiece. With reciprocating workpiece speeds within the range of about 45 to 75 passes per minute, the surface speed of the wheel past the workpiece generally should be at least 2400 feet per minute, 4000 feet per minute preferred at present.

The following is illustrative of the proper adjustment of the circuit for superior surface smoothness in one particular application. Using a 440 volt, 3 phase, 60 cycle supply, with the voltage reduced to about 87 volts by transformer 16, potentiometer 28 and resistor 36, having a movable contact 48 and a plurality of contact points 50, are adjusted to provide a minimum resistance. The condenser system 38, comprising a plurality of condensers 52 which may be connected in parallel by regulating adjustable switch 54 to positions 1, 2 or 3, is adjusted to provide a maximum capacitance. In a typical case each of the condensers 52 has a value of 35 microfarads and hence, when connected in parallel by adjustable switches 54 will provide a total of 105 microfarads in the circuit. By such a regulation of the circuit, a pulsating D. C. current having a pulsation frequency of approximately 360 cycles per second is provided, and an optimum electrical discharge is obtained between the wheel 12 and workpiece 10 when pressed together.

From the foregoing description it will now be understood that by employing the method and apparatus of the present invention it is no longer necessary to use costly diamond cutting and grinding wheels. More important, however, is that the practice of the present invention provides an extremely smooth surface finish on hard electroconductive tool materials such as tungsten carbide and the like during the cutting or grinding operation.

Various changes and modifications of the embodiments of the invention described herein may be made by those skilled in the art without departing from the spirit and principles of the invention.

What is claimed:

1. A method of grinding a hard electroconductive material to obtain a desired shape while simultaneously providing said material with an extremely smooth surface, said method comprising electrically connecting said electroconductive material to the positive terminal of a source of pulsating direct current of 10 to 30 volts, connecting to the negative terminal of said source of pulsating direct current a wheel electrode having a grinding surface formed of a generally uniform mixture of aluminum oxide particles bound together by a metal conductor, rotating said wheel electrode, supplying an aqueous solution of sodium silicate and sodium carbonate to the rotating wheel electrode to provide a thin film of said solution on said grinding surface, passing a current of 300 to 350 amperes per square inch between said grinding surface and said electroconductive material, pressing said electroconductive material against the grinding surface of said rotating wheel electrode with a pressure of at least 30 p. s. i. and sufficient to continuously dislodge a portion of said aluminum oxide particles from said wheel electrode during the grinding operation and suspend said dislodged particles in said solution on said grinding surface, thereafter retaining a portion of said solution with said particles suspended therein on said grinding surface to continuously provide said thin film, the surface speed of said wheel electrode relative to the electroconductive material being at least 2400 feet per minute.

2. A method of grinding a workpiece formed of a hard electroconductive material while simultaneoulsy providing said workpiece with an extremely smooth surface, said method comprising electrically connecting said workpiece to the positive terminal of a source of pulsating direct current, connecting to the negative terminal of said source of pulsating direct current a wheel electrode having a grinding surface formed of a generally uniform mixture consisting principally of particles of refractory material bound together by a metal conductor, rotating said wheel electrode, supplying an aqueous solution containing sodium silicate against the rotating wheel electrode to provide a thin film of said solution on said grinding surface, passing a pulsating direct current through said terminals and between said workpiece and said wheel electrode, pressing said workpiece against the grinding surface of said rotating wheel electrode while said film is on said surface, the pressure between said workpiece and said electrode being at least 30 p. s. i. and sufficient to gradually and continuously dislodge a portion of said particles from said electrode and suspend said dislodged particles in said solution on said grinding surface while said workpiece is pressed against said surface, thereafter retaining a portion of said solution with said particles suspended therein on said grinding surface to continuously provide said thin film, and reciprocating said workpiece while pressed against said rotating wheel electrode so as to produce a surface speed of the wheel electrode relative to the workpiece of at least 2400 feet per minute.

References Cited in the file of this patent

UNITED STATES PATENTS

| | | |
|---|---|---|
| 1,017,671 | Jenkins | Feb. 20, 1912 |
| 2,360,798 | Seligman | Oct. 17, 1944 |
| 2,385,198 | Engle | Sept. 18, 1945 |
| 2,559,263 | Smith | July 3, 1951 |

OTHER REFERENCES

Keeleric: "Steel," March 17, 1952, vol. 130, No. 3, pp. 84 to 86, article entitled "Electrolytic grinding."

"New Processes for Machining and Grinding," Report No. MAB–18–M of National Research Council, January 18, 1952, Appendix VI, pages 1 to 9 and Figs. 1 to 4.